July 21, 1925.
S. M. FAIRCHILD
1,546,372
APPARATUS FOR AERIAL PHOTOGRAPHY
Filed March 1, 1923   2 Sheets-Sheet 2
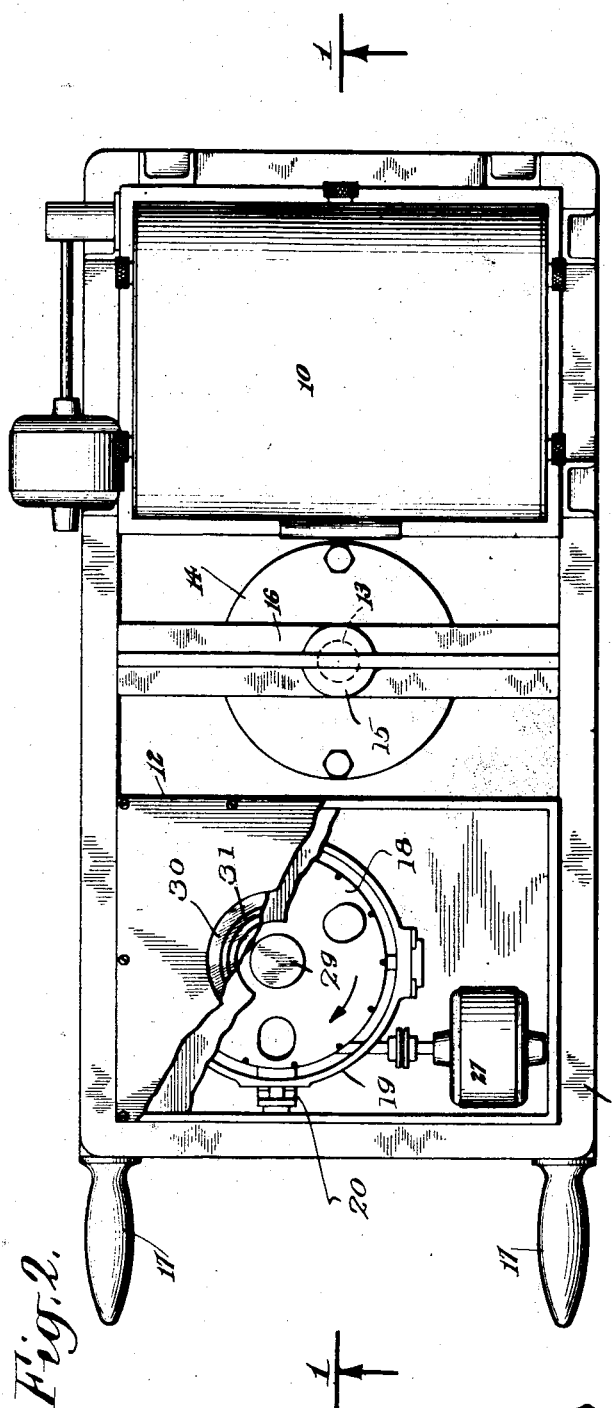
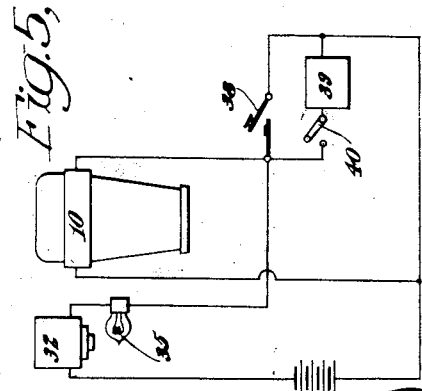
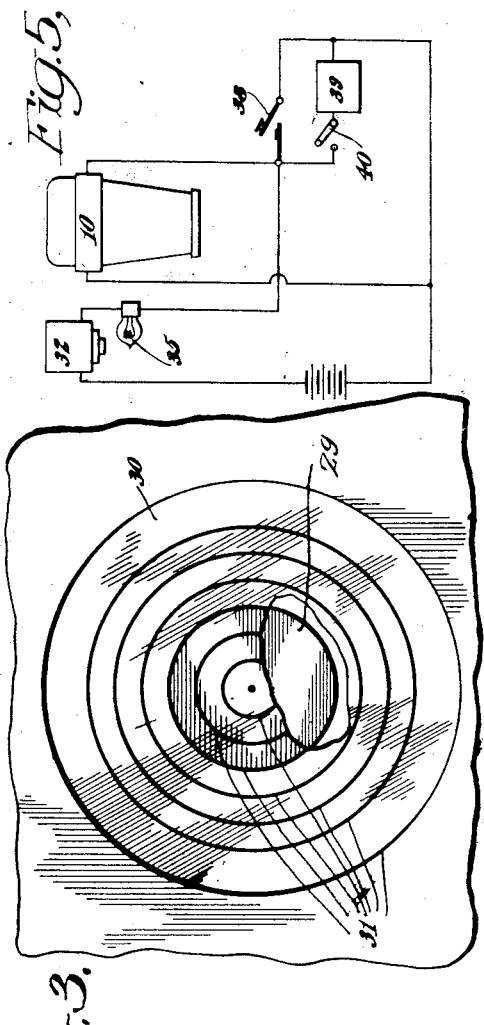
INVENTOR
S. M. Fairchild
BY
Cooper, Kerr & Dunham
ATTORNEYS Patented July 21, 1925.

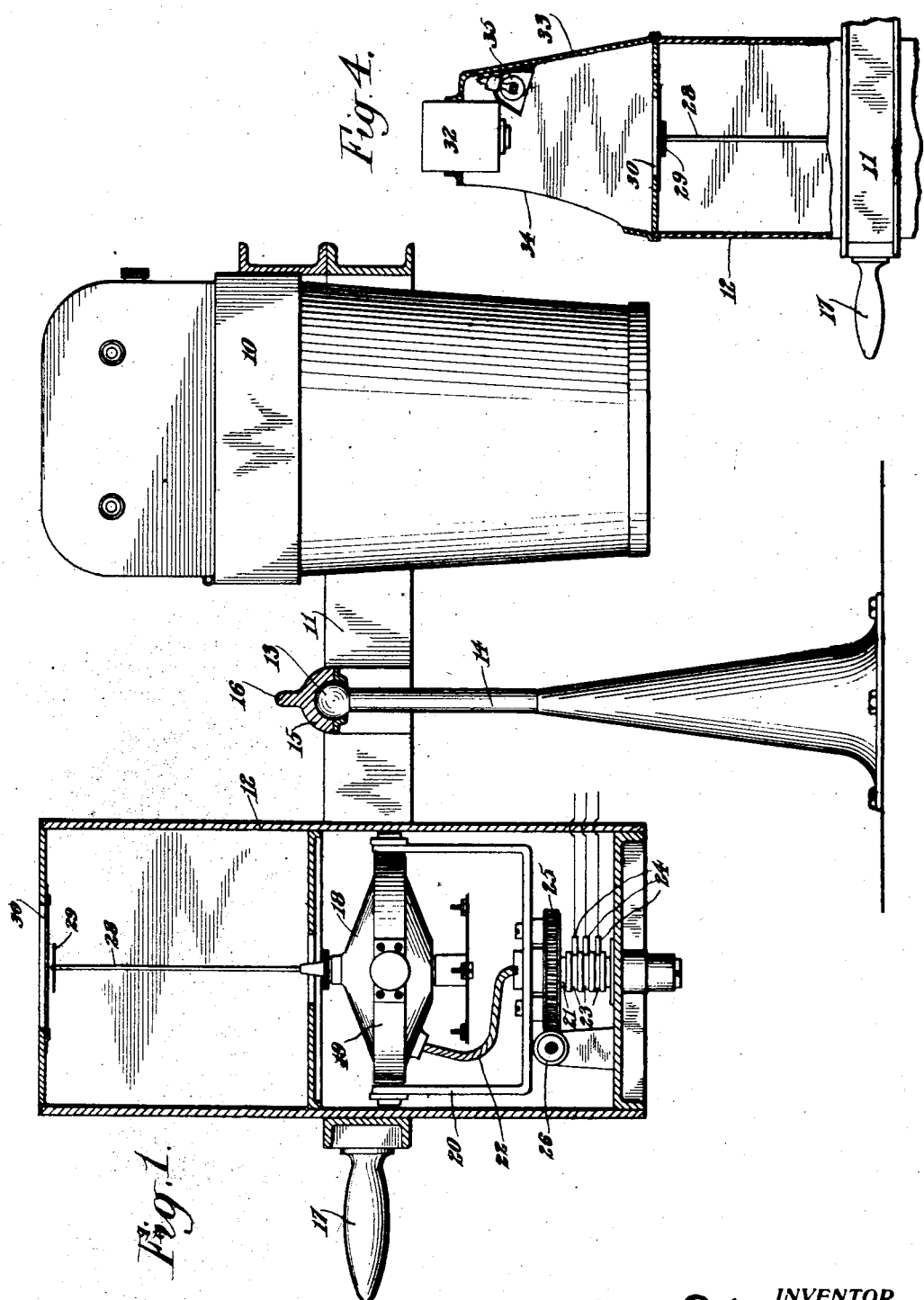

1,546,372

UNITED STATES PATENT OFFICE.

SHERMAN M. FAIRCHILD, OF NEW YORK, N. Y.

APPARATUS FOR AERIAL PHOTOGRAPHY.

Application filed March 1, 1923. Serial No. 622,037.

*To all whom it may concern:*

Be it known that I, SHERMAN M. FAIRCHILD, a citizen of the United States of America, residing at New York city, in the county of New York and State of New York, have invented certain new and useful Improvements in Apparatus for Aerial Photography, of which the following is a full, clear, and exact description.

In aerial photography it is often necessary or at least desirable to have the camera "stabilized" so that its axis will keep a constant position with reference to the object to be photographed. For example, in taking successive photographs of the ground for the production of a mosaic map or print the camera axis should, in most cases, be as nearly as possible vertical, or normal to the earth, when the exposures are made. It has been proposed to employ a gyroscope for the purpose, connected rigidly to the camera so as to take advantage of the tendency of the gyroscope to maintain its axis in constant parallelism to its successive positions in space as the airplane advances. In general, however, this method is not suitable, for the reason that if the gyro axis is initially vertical to the ground and if it is maintained parallel to this initial position, it will, after a short time, no longer be vertical but will make an appreciably oblique angle to the normal because of the rotation of the earth and the travel of the airplane. Assuming that the gyro axis was initially vertical and that it accurately maintains its parallelism, the angular divergence between the axis and the true vertical at another point in the path of the plane depends, theoretically, upon the angular separation of the two points, measured on a great circle of the terrestrial sphere or spheroid, and the angle of rotation of the earth during the time elapsed in the travel of the airplane; and it will readily be seen that a few miles of travel suffice to make this divergence appreciable.

Even if means are employed for correcting the gyroscope for these errors, to stabilize a camera within any degree of precision would require an excessively large gyroscope, which might even then be subject to errors due to unbalance of the camera due to shift of the film or other causes. While devices for causing the camera to maintain its position relative to the gyroscope without applying serious disturbing forces to the gyroscope are possible, in some cases the complication of these devices might be undesirable, and for these cases it is advantageous to provide means for indicating the relative orientation of the camera and the gyroscope, and to manually control the position of the camera in accordance with this indication.

It is, of course, well known that a spirit level or similar device is subject to large errors due to the varying and erratic accelerations of an airplane.

My present invention relates to the problem of having the camera axis vertical or in some other known relation to the object to be photographed, but in its preferred form the gyroscope does not actually maintain the camera in position. On the contrary, the gyro is employed as an indicating device, and means are provided for "erecting" the gyro so that its axis is stabilized in the vertical position or will be returned to the vertical if caused to depart therefrom. The camera is universally mounted and is connected with the gyroscope in such manner that it may be adjusted relatively to the latter by the operator, who, by reference to the indicator, can shift the camera to position its axis whenever necessary or desirable. The invention also includes means for photographing the indicator to record the divergence, if any, of the camera axis from the desired position.

A simple embodiment of the invention is illustrated in the accompanying drawings, in which Fig. 1 is a side view, partly in section on line 1—1 of Fig. 2.

Fig. 2 is a plan view with part of the top of the gyroscope casing broken away.

Fig. 3 is a detail plan view of the transparent indicator plate with part of the same broken away to show the indicator button or disk below.

Fig. 4 is a detail sectional view of the indicator, showing conventionally a camera for photographing the same to record the position of the axis of the main camera.

Fig. 5 is a diagram illustrating a system of electrical control which may be used when a recording camera is employed.

In the apparatus illustrated the camera 10 is fixed in one end of a rectangular frame 11, the other end of which carries the gyroscope casing or housing 12. The supporting frame mentioned is universally mounted so as to be capable of pivotal adjustment in all directions. As indicative of such a mounting I have shown a ball-and-socket joint, the ball 13 being on top of a pedestal 14 and the socket 15 on a bar 16 extending across the frame 11. It will be understood that the pedestal can be mounted on any suitable part of an airplane or other flying craft. For convenient grasp in adjusting the frame it is provided with handle 17. The optical axis of the camera is perpendicular to the plane of the frame 11.

The gyroscope, which may be of the "erected" type described in U. S. patent of J. and J. G. Gray No. 1,308,783, issued July 8, 1919, is represented somewhat diagrammatically at 18. As shown, it is pivotally mounted in a gimbal ring 19, which is itself pivotally mounted (on pivots in the same plane but at right angles to the gyroscope pivots) in a fork 20 mounted on a rotatable hollow spindle 21 in the lower part of the housing 12. The spindle is coaxial with the gyroscope rotor. The gyroscope is driven electrically by current supplied through a cable 22 which extends into the spindle 21 where its conductors are connected to slip rings 23 upon which the brushes 24 are held in any convenient manner, not shown. It will be understood that the spinning element or rotor of the gyroscope is inside of the casing or chamber 18.

In order to maintain the axis of the gyroscope vertical, or causing it to return automatically to the vertical position after departing therefrom, the spindle 21 is rotated continuously in the direction of rotation of the spinning element, say in the direction of the arrow in Fig. 2. For this purpose the spindle is equipped with a worm gear 25 meshing with a worm 26 driven by an electric motor 27, Fig. 2. A gyroscope so operated is said to be stabilized or "erected".

Extending upwardly from the gyroscope casing 18 and in line with the axis of the rotor is a pointer 28, terminating in a button or disk 29 in a position below and close to a transparent window 30 arranged in a plane perpendicular to the camera axis and bearing a series of concentric indicating circles 31, Fig. 3, so located that when the axis of the camera, which is fixed with respect to the supporting frame 11 and gyroscope housing 12, is parallel to the axis of the gyroscope, the circles will be concentric with the indicator button 29.

In using the apparatus the operator notes by reference to the indicator in the top of the gyroscope housing whether or not the camera axis is parallel to the gyroscope axis. If not, he can correct the position of the camera before the exposure by tilting the frame 11 in the proper direction, bringing the indicator circles to the position at which they are concentric with the disk 29.

For the purpose of recording the relative positions of the axes of the camera and gyroscope, the gyro housing 12 may be equipped with a camera 32, Fig. 4, in position to photograph the indicator, and supported in any convenient way, as for example by a hood 33, which may have an opening 34 in one side to permit visual observation of the indicator. The latter can be suitably illuminated by a hooded electric lamp 35. Preferably the two exposures (by the main camera 10 and the auxiliary or recording camera 32) are made at precisely the same instant, and accordingly both cameras may be of the electrically-controlled type, in which the shutters are tripped simultaneously by devices under the control of, say, the same electric circuit. This mode of operation is indicated in Fig. 5, in which the electrically actuated or controlled shutters of the main and auxiliary cameras, represented diagrammatically at 10 and 32 respectively, are in parallel in a normally open circuit which may be closed at will by means of a spring key 38 to release the shutters simultaneously. If successive exposures at regularly recurring intervals are to be made, the circuit may be closed and opened periodically by timing mechanism, of any suitable kind, represented diagrammatically at 39. This mechanism may be bridged across the key 38 through a switch 40. The circuit is controlled by the key when the switch is open and by the automatic timing mechanism when the switch is closed, as will be readily understood.

It will be observed that the camera and the indicator dial 30 are in fixed relation to each other, since both are fixed to the universally pivoted frame or carrier 11. On the other hand, the gyroscope, 18, is universally mounted with respect to the indicator dial and camera, and hence does not affect the position of the latter parts but serves to provide, through the agency of the pointer 28, a line of reference which is always substantially vertical with respect to the earth.

It is to be understood that the invention is not limited to the construction herein specifically illustrated and described but may be embodied in other forms without departure from its spirit.

I claim:—

1. In apparatus for aerial photography, in combination, a camera and an indicator dial in fixed relation to each other, a gyroscope having a pointer in fixed relation to its axis and cooperating with the indicator dial, means for erecting the gyroscope, and pivotal supporting means for the camera and dial whereby they may be shifted with respect to said pointer.

2. In combination, a gyroscope, erecting means therefor, a camera, means for indicating the relative orientation of the camera and gyroscope, and means for angular adjustment of the camera relative to the gyroscope.

3. In apparatus for aerial photography, in combination, a camera and an indicator dial fixed in relation to each other, a gyroscope having a pointer in fixed relation to its axis and cooperating with the indicator dial, means for erecting the gyroscope, pivotal supporting means for the camera and dial whereby they may be shifted with respect to said pointer, and means for recording the relative positions of said indicator and dial when making an exposure with the camera.

4. In apparatus for aerial photography, in combination, a camera and an indicator dial in fixed relation to each other, a gyroscope having a pointer in fixed relation to its axis and cooperating with the indicator dial, means for erecting the gyroscope, pivotal supporting means for the camera and dial whereby they may be shifted with respect to said pointer, and means for photographically recording the relative positions of said indicator and dial when making an exposure with the camera.

5. In combination, a gyroscope, erecting means therefor, a camera, means for indicating the relative orientation of the camera and gyroscope, means for angular adjustment of the camera relative to the gyroscope, and means for recording the relative orientation of the camera and gyroscope when making an exposure with the camera.

6. In combination, a gyroscope, erecting means therefor, a camera, means for indicating the relative orientation of the camera and gyroscope, means for angular adjustment of the camera relative to the gyroscope, and means for photographically recording the relative orientation of the camera and gyroscope when making an exposure with the camera.

7. In combination, a universally mounted frame, a camera and a dial rigidly mounted on the frame, a gyroscope and erector therefor universally mounted on the frame, and a pointer mounted on the gyroscope and cooperating with the dial, for indicating the relative orientation of the gyroscope and the camera.

8. In combination, a universally mounted frame and a camera and a dial rigidly attached to the frame, a gyroscope and erector therefor universally mounted on the frame, a pointer mounted on the gyroscope and cooperating with the dial, for indicating the relative orientation of the gyroscope and the camera, and means for recording the relative positions of the pointer and dial.

9. In combination, a universally mounted frame, and a camera and a dial rigidly attached to the frame, a gyroscope and erector therefor universally mounted on the frame, a pointer mounted on the gyroscope and cooperating with the dial, for indicating the relative orientation of the gyroscope and the camera, and means for recording the relative positions of the pointer and dial at the time of making an exposure with the camera.

10. In combination, a universally mounted frame, and a camera and a dial, and universally mounted thereon a gyroscope and erector therefor universally mounted on the frame, a pointer mounted on the gyroscope and cooperating with the dial, for indicating the relative orientation of the gyroscope and the camera, and photographic means for recording the relative positions of the pointer and dial at the time of making an exposure with the camera.

In testimony whereof I hereto affix my signature.

SHERMAN M. FAIRCHILD.